United States Patent
Katerberg et al.

(10) Patent No.: US 8,952,784 B2
(45) Date of Patent: Feb. 10, 2015

(54) VERIFYING IDENTIFICATION OF SEQUENTIALLY SUPPLIED FLUIDS

(75) Inventors: James Alan Katerberg, Kettering, OH (US); Edward Zogg, Ontario, NY (US); Mark P. Hinman, Holley, NY (US)

(73) Assignee: Eastman Kodak Company, Rochester, NV (US)

( * ) Notice: Subject to any disclaimer, the term of this patent is extended or adjusted under 35 U.S.C. 154(b) by 436 days.

(21) Appl. No.: 13/478,234

(22) Filed: May 23, 2012

(65) Prior Publication Data

US 2013/0314206 A1   Nov. 28, 2013

(51) Int. Cl.
*G06F 7/04* (2006.01)

(52) U.S. Cl.
USPC ............................................ 340/5.8; 340/10.1

(58) Field of Classification Search
CPC .......................... B41J 2/17546; B41J 2/17503
USPC ............... 340/5.8, 10.1, 10.4; 347/19; 399/24
See application file for complete search history.

(56) References Cited

U.S. PATENT DOCUMENTS

| | | | |
|---|---|---|---|
| 6,169,910 B1 | 1/2001 | Tamil et al. | |
| 6,385,407 B1 * | 5/2002 | Inose | ............................... 399/24 |
| 6,467,888 B2 | 10/2002 | Wheeler et al. | |
| 6,644,544 B1 | 11/2003 | Spurr et al. | |
| 6,725,014 B1 | 4/2004 | Voegele | |
| 6,938,976 B2 | 9/2005 | Siwinski et al. | |
| 7,098,784 B2 | 8/2006 | Easley et al. | |
| 7,106,196 B2 | 9/2006 | Adams et al. | |
| 7,212,637 B2 | 5/2007 | Salisbury | |
| 7,280,251 B1 | 10/2007 | Holub | |
| 7,401,052 B2 | 7/2008 | Lyman | |
| 7,747,344 B2 | 6/2010 | O'Dougherty et al. | |
| 7,852,219 B2 | 12/2010 | Childress et al. | |
| 7,969,286 B2 | 6/2011 | Adelbert | |
| 2002/0015066 A1 * | 2/2002 | Siwinski et al. | ................. 347/19 |
| 2005/0174371 A1 | 8/2005 | Deshmukh et al. | |
| 2005/0174376 A1 * | 8/2005 | Deshmukh et al. | ............. 347/19 |
| 2005/0251480 A1 * | 11/2005 | Lyman | ............................ 705/50 |
| 2008/0106762 A1 | 5/2008 | Mullender et al. | |
| 2009/0213420 A1 | 8/2009 | Dirsch et al. | |
| 2011/0018692 A1 * | 1/2011 | Smith et al. | .................. 340/10.4 |

FOREIGN PATENT DOCUMENTS

JP          2010-023322         2/2010

* cited by examiner

*Primary Examiner* — Edwin Holloway, III
(74) *Attorney, Agent, or Firm* — Christopher J. White; Peyton C. Watkins

(57) ABSTRACT

A method of verifying the identification of fluids to be supplied successively through a fluid-supply hose that selectively connects to successive movable, RFID-tagged fluid containers includes providing an RFID reading unit including an antenna. A sequence of reference container identification codes is received. A container-present indication indicating one of the containers is positioned so that its RFID tag is in the antenna range is received. In response, the RFID tag of that container is read using the RFID reading unit to determine an identification code of the container. A controller automatically verifies the determined container identification code against the first reference identification code in the sequence using a controller. The starting through verifying steps are repeated, using successive values from the sequence in the verifying step, until all values in the sequence have been verified against container identification codes read using the RFID reading unit.

17 Claims, 5 Drawing Sheets

VERIFYING IDENTIFICATION OF SEQUENTIALLY SUPPLIED FLUIDS

CROSS-REFERENCE TO RELATED APPLICATIONS

This application is co-filed with and has related subject matter to U.S. patent application Ser. No. 13/478,214, filed herewith, titled "VERIFYING IDENTIFICATION OF FLUID SUPPLIED THROUGH HOSE;" U.S. patent application Ser. No. 13/478,226, filed herewith, titled "IDENTIFYING FLUID SUPPLIED THROUGH HOSES;" and U.S. patent application Ser. No. 13/478,205, filed herewith, titled "IDENTIFYING FLUID SUPPLIED THROUGH HOSE;" the disclosures of which are incorporated herein by reference.

FIELD OF THE INVENTION

This invention pertains to the field of radio-frequency communication between radio-frequency identification (RFID) tags and RFID readers, and more particularly to using RFID to identify materials.

BACKGROUND OF THE INVENTION

Various electronic equipment or devices can communicate using wireless links. A popular technology for communication with low-power portable devices is radio frequency identification (RFID). Standardized RFID technology provides communication between an interrogator (or "reader") and a "tag" (or "transponder"), a portable device that transmits an information code or other information to the reader. Tags are generally much lower-cost than readers. RFID standards exist for different frequency bands, e.g., 125 kHz (LF, inductive or magnetic-field coupling in the near field), 13.56 MHz (HF, inductive coupling), 433 MHz, 860-960 MHz (UHF, e.g., 915 MHz, RF coupling beyond the near field), 2.4 GHz, or 5.8 GHz. Tags can use inductive, capacitive, or RF coupling (e.g., backscatter, discussed below) to communicate with readers. Although the term "reader" is commonly used to describe interrogators, "readers" (i.e., interrogators) can also write data to tags and issue commands to tags. For example, a reader can issue a "kill command" to cause a tag to render itself permanently inoperative.

Radio frequency identification systems are typically categorized as either "active" or "passive." In an active RFID system, tags are powered by an internal battery, and data written into active tags can be rewritten and modified. In a passive RFID system, tags operate without an internal power source, instead being powered by received RF energy from the reader. "Semi-active" or "semi-passive" tags use batteries for internal power, but use power from the reader to transmit data. Passive tags are typically programmed with a unique set of data that cannot be modified. A typical passive RFID system includes a reader and a plurality of passive tags. The tags respond with stored information to coded RF signals that are typically sent from the reader. Further details of RFID systems are given in commonly-assigned U.S. Pat. No. 7,969,286 to Adelbert, and in U.S. Pat. No. 6,725,014 to Voegele, both of which are incorporated herein by reference.

In a commercial or industrial setting, tags can be used to identify containers of products used in various processes. A container with a tag affixed thereto is referred to herein as a "tagged container." Tags on containers can carry information about the type of products in those containers and the source of those products. For example, as described in the GS1 EPC Tag Data Standard ver. 1.6, ratified Sep. 9, 2011, incorporated herein by reference, a tag can carry a "Serialized Global Trade Item Number" (SGTIN). Each SGTIN uniquely identifies a particular instance of a trade item, such as a specific manufactured item. For example, a manufacturer of cast-iron skillets can have, as a "product" (in GS1 terms) a 10" skillet. Each 10" skillet manufactured has the same UPC code, called a "Global Trade Item Number" (GTIN). Each 10" skillet the manufacturer produces is an "instance" of the product, in GS1 terms, and has a unique Serialized GIN (SGTIN). The SGTIN identifies the company that makes the product and the product itself (together, the GTIN), and the serial number of the instance. Each box in which a 10" skillet is packed can have affixed thereto an RFID tag bearing the SGTIN of the particular skillet packed in that box. SGTINs and related identifiers, carried on RFID tags, can permit verifying that the correct products are used at various points in a process.

In industrial and commercial processes, raw materials are matched to the specific machines that process them. For example, in inkjet printing presses, it is necessary to provide the correct color of ink to each printhead. It is further necessary to do so while permitting different sizes and shapes of ink containers to be used, depending on the needs of each customer. JP2010-023322 describes surrounding inter-antenna spaces with magnetic material to reduce mutual interference between adjacent RFID tags on interchangeable units of an image-forming apparatus. However, this magnetic material restricts the size and shape of interchangeable units that can be used. U.S. Pat. No. 7,106,196 describes fine-tuning read range of RFID devices. However, this scheme requires a surface treatment deposited on an RFID device.

Examples of inkjet printer ink supply systems are given in U.S. Pat. No. 7,401,052, which is incorporated herein by reference.

There is, therefore, a continuing need for ways of reliably, flexibly using RFID technology to reliably fluids to be supplied to a machine.

SUMMARY OF THE INVENTION

According to an aspect of the present invention, there is provided a method of verifying the identification of fluids to be supplied successively through a fluid-supply hose, the hose being adapted to connect to one at a time of a plurality of movable fluid containers, each container including an RFID tag, the method comprising:

providing an RFID reading unit including an antenna having a range;

providing the fluid-supply hose;

a reference-receiving step of receiving a sequence of reference container identification codes;

a starting step of receiving a container-present indication, wherein when the container-present indication is received, one of the containers is positioned so that its RFID tag is in the antenna range;

in response to the container-present indication, reading the RFID tag of the one of the containers using the RFID reading unit to determine an identification code of the container;

automatically verifying the determined identification code of the one of the containers against the first reference identification code in the sequence using a controller; and repeating the starting through verifying steps, using successive values from the sequence in the verifying step, until all values in the sequence have been verified against container identification codes read using the RFID reading unit.

An advantage of this invention is that it clearly matches a fluid to the corresponding hose. Various embodiments use directional and shaped-pattern antennas to produce small antenna ranges, effectively rejecting nearby RFID tags not participating in the hose-fluid connection. Any size or shape of fluid container can be used. Various embodiments do not require surface treatment to control RF properties.

In an inkjet printer system, various embodiments reduce the probability of accidentally transferring black ink into a fluid system containing yellow ink, or of transferring an ink into an inkjet fluid system containing an ink with which it could adversely react. Various embodiments are useful during an ink change in an inkjet printer to verify that various cleaning or conditioning fluids are supplied to the correct hose in the correct order. Various embodiments permit identifying not just the color of ink (e.g., black), but the specific composition or classification of the particular ink.

In various embodiments, the RFID tag on the fluid container can carry information about the fluid. Using information on the tag, identification can be made of components of a printer or other hardware making use of the fluid, or other fluids used in the system, that are inconsistent or incompatible with the fluid. For example, the specific modification, version level, or type of product, can be used to determine compatibility or consistency. Runtime databases can be updated to maintain proper operation during the life cycle of the system. Warnings can be provided, e.g., to operators, of combinations of items that can cause problems in the system.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

The attached drawings are for purposes of illustration and are not necessarily to scale.

DETAILED DESCRIPTION OF THE INVENTION

In the following description, some embodiments will be described in terms that would ordinarily be implemented as software programs. Those skilled in the art will readily recognize that the equivalent of such software can also be constructed in hardware. Because image manipulation algorithms and systems are well known, the present description will be directed in particular to algorithms and systems forming part of, or cooperating more directly with, methods described herein. Other aspects of such algorithms and systems, and hardware or software for producing and otherwise processing the image signals involved therewith, not specifically shown or described herein, are selected from such systems, algorithms, components, and elements known in the art. Given the system as described herein, software not specifically shown, suggested, or described herein that is useful for implementation of various embodiments is conventional and within the ordinary skill in such arts.

A computer program product can include one or more storage media, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice methods according to various embodiments.

Figure 1:
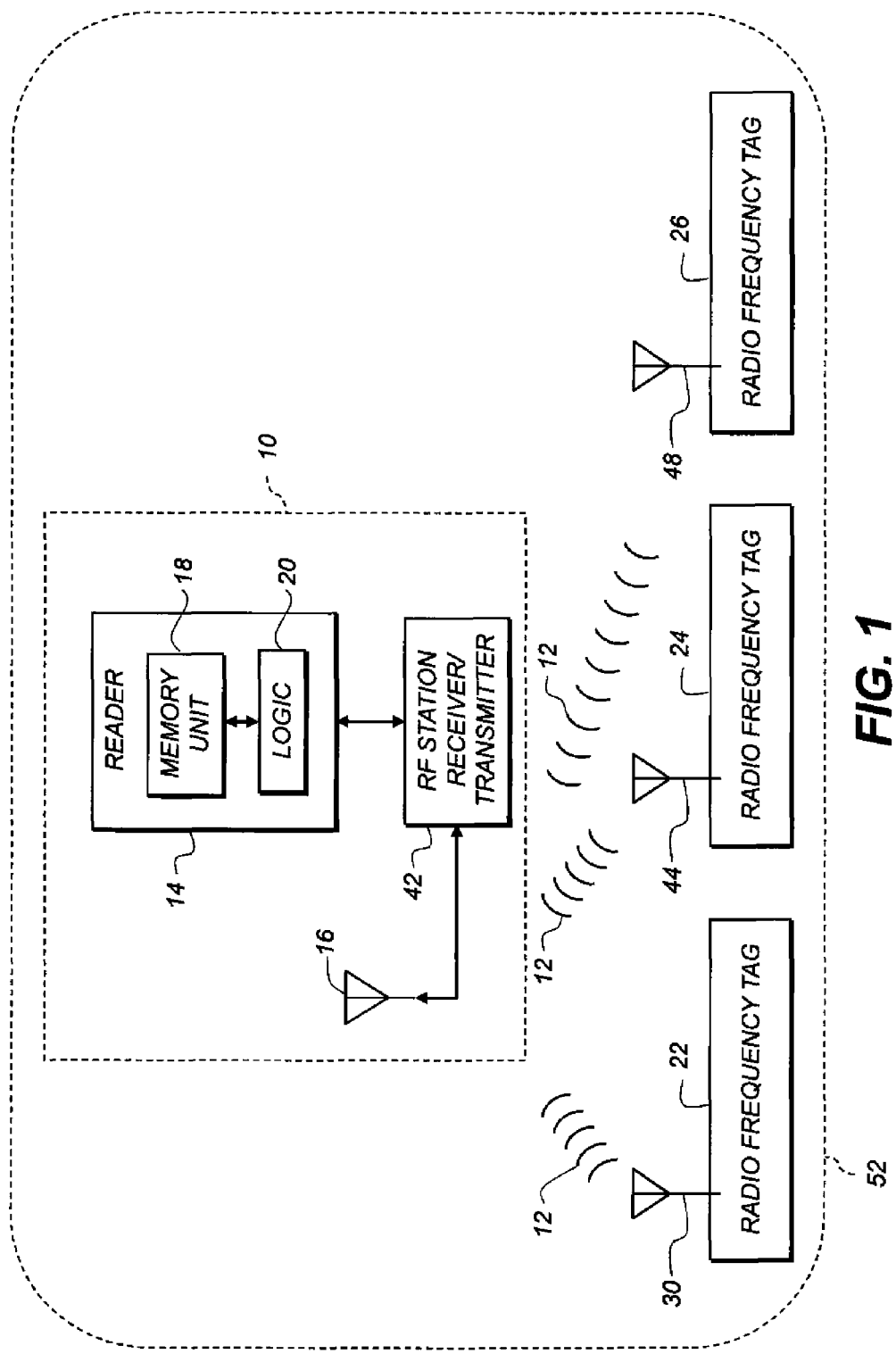
FIG. 1 is a block diagram of an RFID system according to various embodiments.

FIG. 1 is a block diagram of an RFID system according to various embodiments. Base station 10 communicates with three RF tags 22, 24, 26, which can be active or passive in any combination, via a wireless network across an air interface 12. FIG. 1 shows three tags, but any number can be used. Base station 10 includes reader 14, reader's antenna 16 and RF station 42. RF station 42 includes an RF transmitter and an RF receiver (not shown) to transmit and receive RF signals via reader's antenna 16 to or from RF tags 22, 24, 26. Tags 22, 24, 26 transmit and receive via respective antennas 30, 44, 48.

Reader 14 includes memory unit 18 and logic unit 20. Memory unit 18 can store application data and identification information (e.g., tag identification numbers) or SG TINs of RF tags in range 52 (RF signal range) of reader 14. Logic unit 20 can be a microprocessor, FPGA, PAL, PLA, or PLD. Logic unit 20 can control which commands that are sent from reader 14 to the tags in range 52, control sending and receiving of RF signals via RF station 42 and reader's antenna 16, or determine if a contention has occurred.

Reader 14 can continuously or selectively produce an RF signal when active. The RF signal power transmitted and the geometry of reader's antenna 16 define the shape, size, and orientation of range 52. Reader 14 can use more than one antenna to extend or shape range 52.

Figure 2:
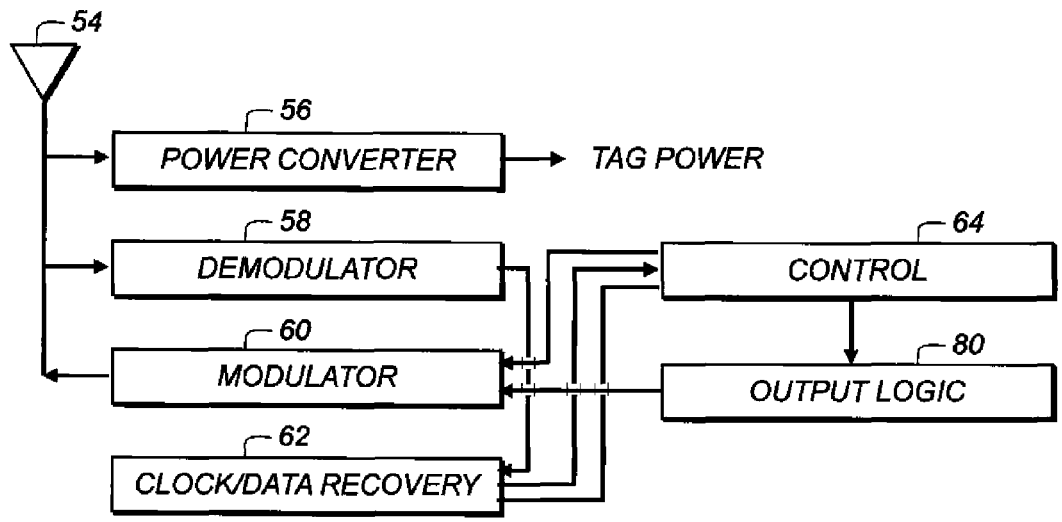
FIG. 2 is a block diagram of a passive RFID tag according to various embodiments.

FIG. 2 is a block diagram of a passive RFID tag (e.g., tags 22, 24, 26 according to an embodiment of the system shown in FIG. 1) according to various embodiments. The tag can be a low-power integrated circuit, and can employ a "coil-on-chip" antenna for receiving power and data. The RFID tag includes antenna 54 (or multiple antennas), power converter 56, demodulator 58, modulator 60, clock/data recovery circuit 62, control unit 64, and output logic 80. Antenna 54 can be an omnidirectional antenna impedance-matched to the transmission frequency of reader 14 (FIG. 1). The RFID tag can include a support, for example, a piece of polyimide (e.g., KAPTON) with pressure-sensitive adhesive thereon for affixing to packages. The tag can also include a memory (often RAM in active tags or ROM in passive tags) to record digital data, e.g., an SGTIN.

Reader 14 (FIG. 1) charges the tag by transmitting a charging signal, e.g., a 915 MHz sine wave. When the tag receives the charging signal, power converter 56 stores at least some of the energy being received by antenna 54 in a capacitor, or otherwise stores energy to power the tag during operation.

After charging, reader 14 transmits an instruction signal by modulating onto the carrier signal data for the instruction signal, e.g., to command the tag to reply with a stored SGTIN. Demodulator 58 receives the modulated carrier bearing those instruction signals. Control unit 64 receives instructions from demodulator 58 via clock/data. recovery circuit 62, which can derive a clock signal from the received carrier. Control unit 64 determines data to be transmitted to reader 14 and provides it to output logic 80. For example, control unit 64 can retrieve information from a laser-programmable or fusible-link register on the tag. Output logic 80 shifts out the data to be transmitted via modulator 60 to antenna 54. The tag can also include a cryptographic module (not shown). The cryptographic module can calculate secure hashes (e.g., SHA-1) of data or encrypt or decrypt data using public- or private-key encryption. The cryptographic module can also perform the tag side of a Diffie-Hellman or other key exchange.

Signals with various functions can be transmitted; some examples are given in this paragraph. Read signals cause the tag to respond with stored data, e.g., an SGTIN. Command signals cause the tag to perform a specified function (e.g., kill). Authorization signals carry information used to establish that the reader and tag are permitted to communicate with each other.

Passive tags typically transmit data by backscatter modulation to send data to the reader. This is similar to a radar system. Reader 14 continuously produces the RF carrier sine wave. When a tag enters the reader's RF range 52 (FIG. 1; also referred to as a "field of view") and receives, through its antenna from the carrier signal, sufficient energy to operate, output logic 80 receives data, as discussed above, which is to be backscattered.

Modulator 60 then changes the load impedance seen by the tag's antenna in a time sequence corresponding to the data from output logic 80. Impedance mismatches between the tag antenna and its load (the tag circuitry) cause reflections, which result in momentary fluctuations in the amplitude or phase of the carrier wave bouncing back to reader 14. Reader 14 senses for occurrences and timing of these fluctuations and decodes them to receive the data clocked out by the tag. In various embodiments, modulator 60 includes an output transistor (not shown) that short-circuits the antenna in the time sequence (e.g., short-circuited for a 1 bit, not short-circuited for a 0 bit), or opens or closes the circuit from the antenna to the on-tag load in the time sequence. In another embodiment, modulator 60 connects and disconnects a load capacitor across the antenna in the time sequence. Further details of passive tags and backscatter modulation are provided in U.S. Pat. No. 7,965,189 to Shanks et al. and in "Remotely Powered Addressable UHF RFID Integrated System" by Curty et al., IEEE Journal of Solid-State Circuits, vol. 40, no. 11, November 2005, both of which are incorporated herein by reference. As used herein, both backscatter modulation and active transmissions are considered to be transmissions from the RFID tag. In active transmissions, the RFID tag produces and modulates a transmission carrier signal at the same wavelength or at a different wavelength from the read signals from the reader.

Figure 3:
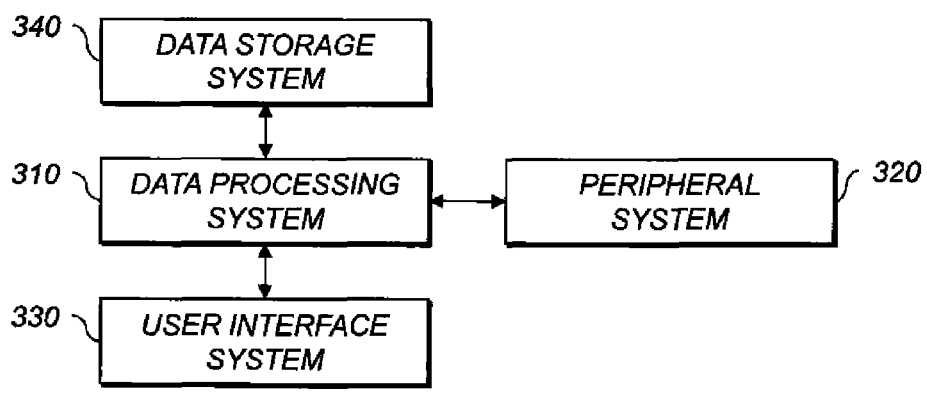
FIG. 3 is a high-level diagram showing the components of a processing system useful with various embodiments.

FIG. 3 is a high-level diagram showing the components of a processing system useful with various embodiments. The system includes a data processing system 310, a peripheral system 320, a user interface system 330, and a data storage system 340. Peripheral system 320, user interface system 330 and data storage system 340 are communicatively connected to data processing system 310.

Data processing system 310 includes one or more data processing devices that implement the processes of various embodiments, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

Data storage system 340 includes one or more processor-accessible memories configured to store information, including the information needed to execute the processes of various embodiments. Data storage system 340 can be a distributed processor-accessible memory system including multiple processor-accessible memories communicatively connected to data processing system 310 via a plurality of computers or devices. Data storage system 340 can also include one or more processor-accessible memories located within a single data processor or device. A "processor-accessible memory" is any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" refers to any type of connection, wired or wireless, between devices, data processors, or programs in which data can be communicated. This phrase includes connections between devices or programs within a single data processor, between devices or programs located in different data processors, and between devices not located in data processors at all. Therefore, peripheral system 320, user interface system 330, and data storage system 340 can be included or stored completely or partially within data processing system 310.

Peripheral system 320 can include one or more devices configured to provide digital content records to data processing system 310, e.g., digital still cameras, digital video cameras, cellular phones, or other data processors. Data processing system 310, upon receipt of digital content records from a device in peripheral system 320, can store such digital content records in data storage system 340. Peripheral system 320 can also include a printer interface for causing a printer to produce output corresponding to digital content records stored in data storage system 340 or produced by data processing system 310.

User interface system 330 can include a mouse, a keyboard, another computer, or any device or combination of devices from which data is input to data processing system 310. Peripheral system 320 can be included as part of user interface system 330. User interface system 330 also can include a display device, a processor-accessible memory, or any device or combination of devices to which data is output by data processing system 310. If user interface system 330 includes a processor-accessible memory, such memory can be part of data storage system 340 even though user interface system 330 and data storage system 340 are shown separately in FIG. 1.

\* \* \*

Figure 4:
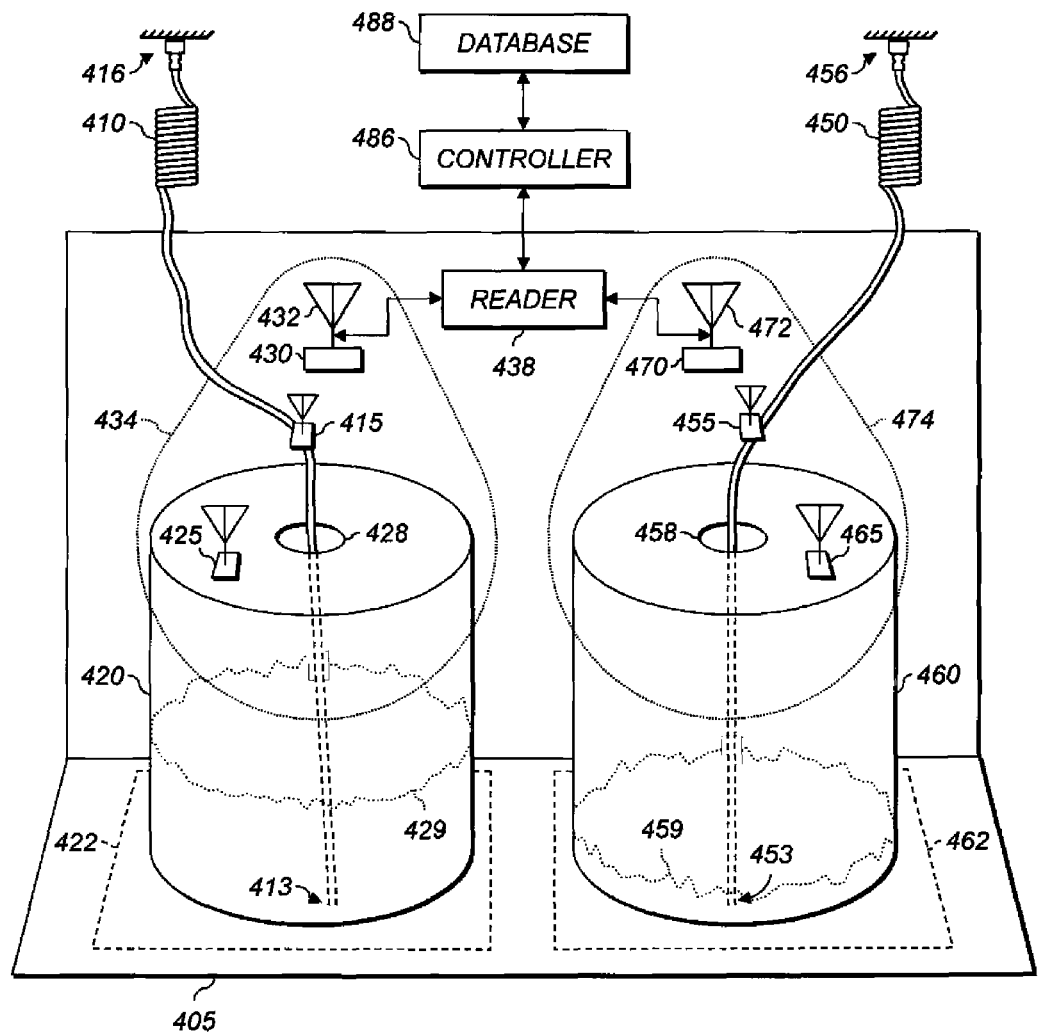
FIG. 4 shows apparatus for identifying fluid to be supplied through a hose according to various embodiments.

FIG. 4 shows apparatus for identifying fluid to be supplied through a hose. In various embodiments, the fluid is supplied through fluid-supply hoses 410, 450 having respective inlet ends 413, 453 and respective outlet ends 416, 456. Hoses 410, 450 are adapted to connect to one of a plurality of movable fluid containers 420, 460. "Connect" refers to any coupling between hoses 410, 450 and containers 420, 460 that permits fluid to flow. This can involve mechanical connectors, or simply include putting the hose into the fluid in the container e.g., through ports 428, 458. In the example shown, each hose 410, 450 extends to the bottom of a corresponding fluid container 420, 460, below respective fluid levels 429, 459. Each container 420, 460 includes respective RFID tag 425, 465 attached thereto or mounted thereon. As described herein, containers 420, 460 hold different fluids (e.g., inks of respective or different colors, or different concentrations of a given solvent). However, containers 420, 460 can hold the same fluid. In various embodiments, electrical connectors can be provided in place of hoses 410, 450, and electrical sources or sinks can be provided in place of containers 420, 460.

Fluid station 405 includes a plurality of antenna mounts 430, 470 at fixed locations. As a result, a respective plurality of fluid-container locations 422, 462 are defined. A plurality of antennas 432, 472 are mounted on the respective antenna mounts 430, 470. As a result, a plurality of respective antenna ranges 434, 474 are defined. RFID reading unit 438 is connected to the plurality of antennas 432, 472. RFID reading unit 438 can be an RFID reader or interrogator, or more than one RFID reader. Reading unit 438 and antennas 432, 472 are configured so that reading unit 438 can read RFID tags in respective antenna range 434, 474 with a selected signal-to-noise ratio, bit error rate, or probability of successful communication.

Fluid-supply hoses 410, 450 include respective RFID tags 415, 455 attached thereto or mounted thereon. Tags 415, 455 are disposed at a position along respective hoses 410, 450 so that they can be positioned within at least two of the antenna ranges 434, 474. Hoses 410, 450 are not required to extend any particular length. In this example, coiled hoses are shown for extendibility. This is optional; non-coiled hoses can also be used. Hoses 410, 450 can include supports (not shown) to relieve strain or to maintain tags 415, 455 in ranges 434, 474. Controller 486 can include a microprocessor, microcontroller, FPGA, PLD, PLA, PAL, ASIC, or other logic or software-executing device.

In various embodiments, fluid station 405 can hold a plurality of containers 420, 460, each in a corresponding fluid-container location 422, 462. A single hose 410 is used, which can draw from either container 420, 460. To identify which fluid will be supplied through hose 410, i.e., from which container 420, 460 fluid will be drawn through hose 410, controller 486 reads the respective RFID tags 425, 465 of the plurality of movable fluid containers 420, 460 positioned in respective fluid-container locations 422, 462 using RFID reading unit 438. Controller 486 then reads RFID tag 415 attached to fluid-supply hose 410 using RFID reading unit 438. Controller 486 then determines which of the plurality of movable fluid containers 420, 460 is positioned in the fluid-container location 422, 462 corresponding to the antenna range 434, 474 in which fluid-supply hose 410 is positioned. The fluid in the determined fluid container (here, of containers 420, 460) is identified as the fluid to be supplied through fluid-supply hose 410.

In an example, tag 425 is in antenna range 434, and tag 465 is in antenna range 474. If controller 486 detects tag 415 of hose 410 in antenna range 434, i.e., the same antenna range as tag 425, controller 486 determines that hose 410 is drawing fluid from container 420. Alternatively, If tags 465 and 415 are detected in the same antenna range (e.g., range 474), controller 486 determines that hose 410 is instead drawing fluid from container 460. In an example, an operator can connect hose 410 to either container 420 or 460, and the controller can determine which by reading hose tag 415 and whichever container tag 425, 465 is in the same antenna range 434, 474 as hose tag 415. If both tags 425 and 465 are detected in the same range as tag 415, or neither tag 425 nor 465 is, controller 486 can report an error to an operator or monitoring system (e.g., SNMP manager), or using a user interface such as a light stack or HMI. In various embodiments, hose 410 has a connector and container 420 has a mating connector, and, when there is an error, controller 486 operates an actuator to change the mechanical configuration of one of the connectors so that they will not mate.

In another example, container 420 is supplying ink of a given color, and hose 410 is drawing the ink to provide it to a printhead. When container 420 is almost empty, an operator brings a full container of ink (not shown) into antenna range 434. Controller 486 then detects two RFID tags of containers in antenna range 434: one for container 420, and one for the new container. If the RFID tags indicate different classifications of fluid, controller 486 reports an error. If both RFID tags indicate the same classification of fluid, controller 486 reports a warning, e.g., through a user interface, but does not report an error or stop the printhead, since it is likely the new container will soon be in use as the active container.

In various embodiments, reader 438 has two directional antennas for each fluid-container location 422, 462. This reduces the probability of undesired overlap between antenna ranges 434 and 474.

In various embodiments, if hose 410 breaks or clogs, the orientation or position of RFID tag 415 changes. Reader 438 detects these changes, e.g., by detecting a change in the received power level. When such a change happens, controller 486 can report a warning to check the corresponding hose.

In various embodiments, each hose tag 415, 455 and container tag 425, 465 includes a respective identification code indicating a particular classification of fluid. In various embodiments, controller 486 communicates with database 488, and each hose and container tag 415, 455, 425, 465 includes a key associated in database 488 with a particular classification of fluid. Controller 486 is adapted to selectively prevent fluid from being drawn, e.g., by controlling a pump (not shown) through a digital interface (not shown). If the hose and container tags in a particular antenna range 434, 474 do not have the same classification, controller 486 prevents fluid from being drawn through that hose. Specifically, in these embodiments, the controller is further adapted to prevent fluid from being drawn through the hose if there is a mismatch between (1) the classification of fluid of the fluid-supply hose; and (2) the classification of fluid of the determined movable fluid container (the container positioned in the fluid-container location corresponding to the antenna range in which the fluid-supply hose is positioned). In various embodiments, a manual override is provided.

In an example, fluid station 405 includes five hoses (not shown): one each for cyan (C), magenta (M), yellow (Y), black (K), and protective (P) ink. Five antennas, antenna mounts, and fluid-container locations are defined. At each fluid-container location, a container of ink (e.g., a 55-gallon drum or five-gallon bag-in-box) is placed, and the corresponding hose is inserted to draw ink of the appropriate color. The fluid classification is the color of ink.

In this example, different sizes of ink container can be used with this system, so the hoses are long enough that there is a chance of inserting a hose for one color (e.g., Y) into a container of another color (e.g., K), contaminating the printer and producing incorrect prints. Ink containers can also be incorrectly placed in fluid station 405, producing similar results. Controller 486 checks the RFID tags of each hose and each container before drawing ink. Ink is not drawn if controller 486 determines that a hose is inserted into a container of another ink color (classification).

Still referring to FIG. 4, in various embodiments, fluid station 405 includes a plurality of hoses 410, 450, any of which can draw fluid from a single container (e.g., container 420 or 460). Antenna mount 430 is located at a fixed location so that fluid-container location 422 is defined. Antenna 432 is mounted on antenna mount 430 so that antenna range 434 is defined.

Fluid-supply hoses 410, 450 each include respective RFID tags 415, 455 attached thereto or mounted thereon. Tags 415, 455 can be selectively positioned within antenna range 434.

Controller 486 reads RFID tag 425 of movable fluid container 420 positioned in fluid-container location 422 using RFID reading unit 438. Controller 486 then reads RFID tag(s) 415 or 455 attached to one or more of the fluid-supply hoses 410, 450 whose respective tag(s) are positioned in antenna range 434. Controller 486 then determines which of the plurality of fluid-supply hoses 410, 450 is positioned in antenna range 434. The fluid in fluid container 420 is identified as the fluid to be supplied through the determined fluid-supply hose 410 or 450. For example, if controller 486 detects tags 415, 425 in range 434, the fluid is being supplied through hose 410. If tags 455 and 465 are detected, the fluid is being supplied through hose 450. If no hose tags 415, 455 are detected, or no container tag 425,465 is detected, controller 486 can report an error. If both hose tags 415, 455 are detected, and container tag 425 is detected, controller 486 can determine that fluid from container 420 is being supplied through both hoses.

In an example, container 420 holds ink of a selected color. Either hose 410 or hose 450 carries ink while the other hose is being cleaned. Controller 486 determines that ink is being carried in the hose whose tag is in range with the tag on container 420. The other hose is deemed to be unused and ready for cleaning.

In various embodiments, controller 486 reads only a single RFID tag (e.g., tag 415 or tag 455) attached to one of the fluid-supply hoses 410, 450, the tag of which hose is positioned in the antenna range. That is, controller 486 only reads one tag even if multiple tags are in the antenna range. In various embodiments, controller 486 reports an error if more than one hose tag is in antenna range 434, or if more than two total tags are in antenna range 434. The numbers of tags in range 434 can be determined using a tag inventory, as described in the EPCglobal UHF Class-1 Gen-2 standard, version 1.2.0 (incorporated herein by reference), sec. 6.3.2.8, pg. 49.

In various embodiments using multiple antennas 432, 472 (or any number of antennas), controller 486 reads one or more tags in each respective antenna range 434, 474. If a given tag is read in more than one antenna range 434, 474, controller 486 can use information about the spatial distributions of antenna ranges 434, 474 to determine the location of the tag, or triangulate the tag's position based on time-of-flight calculations. Controller 486 can also report an error. Controller 486 can also cause reading unit 438 to adjust an adjustable antenna 432, 472, e.g., by mechanically changing the orientation of a directional antenna or by adjusting the phases in a phased-array antenna. Using any of these techniques, singly or in combination, controller 486 identifies the tags (hose or container) in a particular antenna range.

Figure 5:
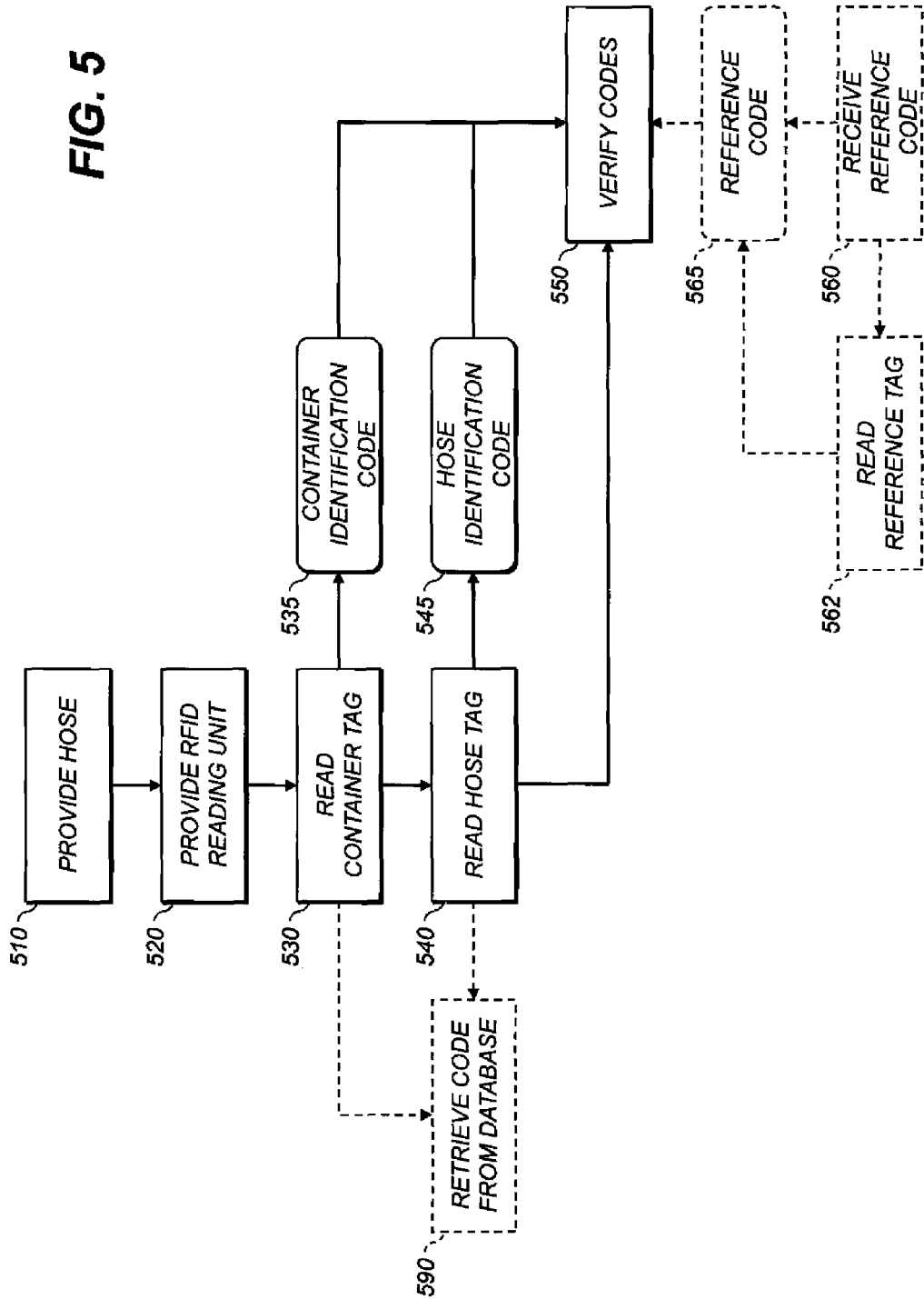
FIG. 5 shows methods of verifying the identification of fluid to be supplied through a fluid-supply hose according to various embodiments.

FIG. 5 shows methods of verifying the identification of fluid to be supplied through a fluid-supply hose according to various embodiments. The hose is adapted to connect to a movable fluid container. The container has an RFID tag attached thereto or mounted thereon. Processing begins with step 510 and, optionally, step 560.

In step 510, the fluid-supply hose is provided. The hose includes an RFID tag attached thereto or mounted thereon. For example, hose 410 with tag 415 (FIG. 4) can be provided (or received). Step 510 is followed by step 520.

In step 520, an RFID reading unit is provided (or received). The unit includes an antenna, and the respective RFID tags of the container and the hose are within a range of the antenna. For example, reading unit 438 and antenna 432 can be provided, with the antennas of tags 415, 425 in antenna range 434 (all FIG. 4). Step 520 is followed by step 530.

In step 530, the RFID tag of the container is read using the RFID reading unit. Identification code 535 of the container is determined using the data read. Step 530 is followed by step 540 and optional step 590 and produces code 535.

Identification code 535 is a container identification code. Identification code 535 can be or include, e.g., a name, GUID, GTIN, or SGTIN of the container. Identification code 535 can be or refer to a classification, such as a type of fluid stored in the container or volume of the container, or can be a serial number of the particular container. Identification code 535 can also indicate the volume of the container or the amount of fluid in the container. In an example, code 535 is a color of ink. Code 535 is provided to step 550.

In step 540, the RFID tag of the fluid-supply hose is read using the RFID reading unit. An identification code 545 of the hose is determined using the read data. The tag of the hose can be at the same time as the tag of the container, or at a different time (before or after). Step 540 is followed by step 550 and optional step 590 and produces code 545.

Identification code 545 is a hose identification code. Identification code 545 can be a classification or an identity, as described above for code 535. In an example, identification code 545 is a color of ink. Identification code 545 is provided to step 550.

In optional step 590, in various embodiments, at least one of the reading steps 530, 540 includes reading an item serial number from the RFID tag (container for step 530; hose for step 540). The serial number is unique to the particular tag, hose, or container. For example, the serial number can be a unique registration number, e.g., a 48-bit unique animal ID per ISO 11784 FDX-B, or a 48-bit IEEE 802 MAC address. The respective identification code corresponding to the read item serial number is then retrieved from a database.

In step 550, the determined identification code 535 of the container is automatically verified against the determined identification code 545 of the hose using a controller. If the two codes do not match, the controller can prevent fluid from being supplied from the container through the hose.

Various embodiments use a reference identification code to which codes 535, 545 are compared. In step 560, reference identification code 565 is received. Received code 565 is stored in a memory. Step 560 can include optional step 562 and produces code 565.

In optional step 562, a reference RFID tag is read using the antenna to determine reference identification code 565. Step 562 produces code 565. Code 565 is a reference identification code of the container, hose, or both, and is provided to step 550.

In these embodiments, step 550 includes automatically verifying the determined identification code 535 of the container against reference identification code 565 stored in the memory, and automatically verifying the determined identification code 545 of the hose against reference identification code 565 stored in the memory. If either code 535, 545 does not match reference code 565, the controller can report an error or prevent fluid from being supplied.

In various embodiments, multiple hoses draw from a single container. In these environments, steps 540-550 are repeated to verify each hose against the container. The hoses can connect to a distribution manifold that has a single draw tube connected to the container. In various embodiments, one hose tag is programmed with the identification codes 545 of a plurality of the hoses connected to a manifold. In various embodiments, the amount(s) of ink drawn through one or more hose(s) are stored on one hose tag, or respective hose tag(s).

Figure 6:
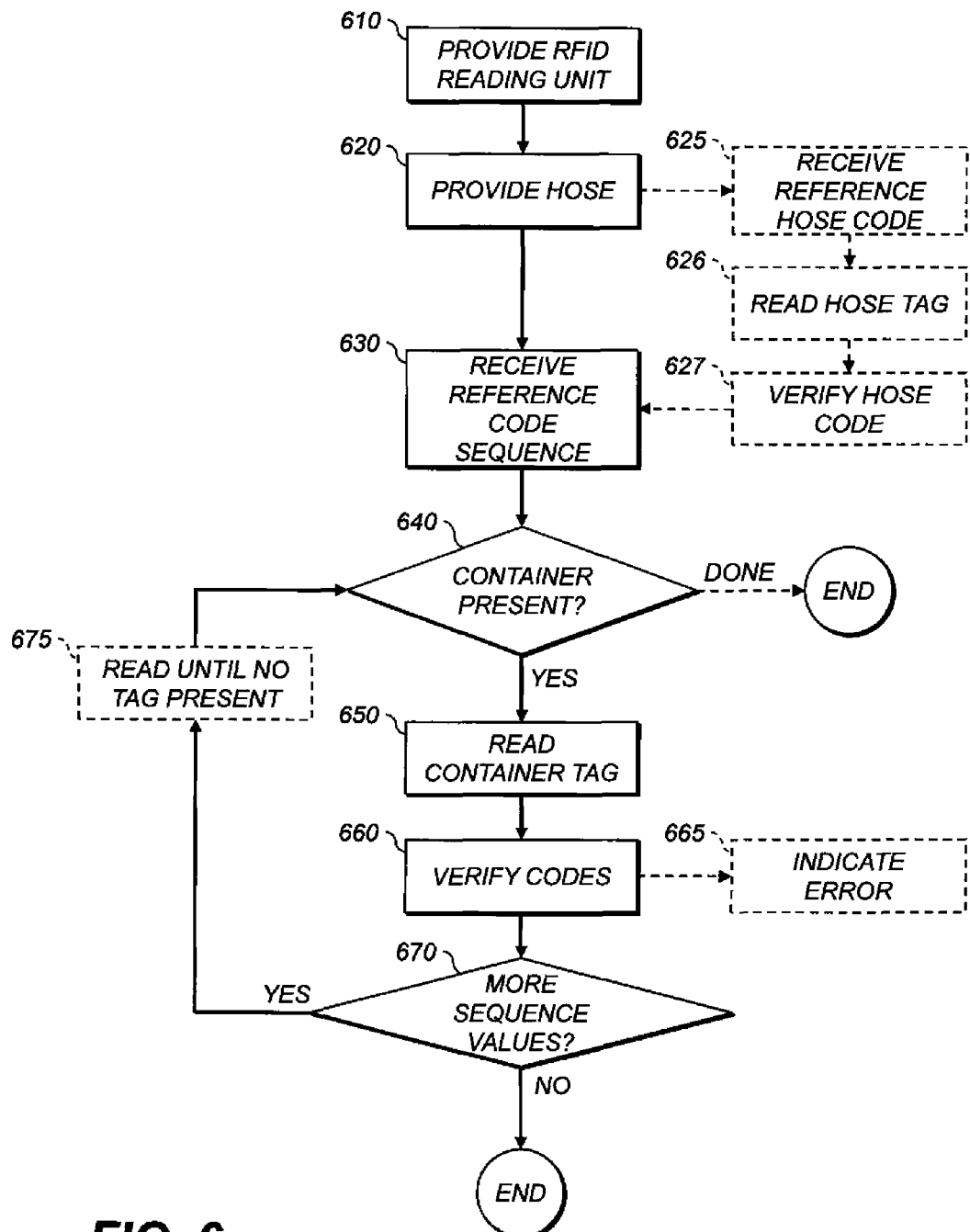
FIG. 6 shows methods of verifying the identification of fluids, e.g., inks, to be supplied successively through a fluid-supply hose according to various embodiments.

FIG. 6 shows methods of verifying the identification of fluids, e.g., inks, to be supplied successively through a fluid-supply hose according to various embodiments. The hose is adapted to connect to one at a time, or several together at a given time, of a plurality of movable fluid containers. Each container includes an RFID tag attached thereto or mounted thereon. Processing begins with step 610.

In step 610, an RFID reading unit is provided. The unit includes an antenna having a range. Step 610 is followed by step 620.

In step 620, the fluid-supply hose is provided. A fluid-supply hose such as those shown in FIG. 4 can be used. Step 620 is followed by step 630 and optional step 625.

In various embodiments, the fluid-supply hose has an RFID tag attached thereto or mounted thereon, and the RFID tag of the hose is within the range of the antenna. In these embodiments, in optional step 625, a reference hose identification code is received. Step 625 is followed by step 626.

In step 626, the RFID tag of the fluid-supply hose is read using the RFID reading unit to determine an identification code of the hose. This can be performed at the same time as reading the tag of the one of the containers (step 650), or at a different time. Step 626 is followed by step 627.

In step 627, the determined identification code of the hose is automatically verified against the reference hose identification code using the controller. Step 627 is followed by step 630.

In step 630, which is a reference-receiving step, a sequence of reference container identification codes is received. The sequence indicates which fluids (or containers of fluids) should be received, and in which order. In various embodiments, the sequence is determined by reading a reference RFID tag using the RFID reading unit. In various embodiments, the RFID tag carrying the reference sequence is affixed to the first container brought into range of the antenna (step 640). Step 630 is followed by decision step 640.

Decision step 640 is a starting step. Decision step 640 decides whether a container of fluid is present, i.e., that one of the containers is positioned so that its RFID tag is in the antenna range. Specifically, a container-present indication is received, e.g., from an operator or a sensor. If a container is present, the next step is step 650. In various embodiments, the controller waits in step 640 for an unlimited time, or for a selected timeout, for a container-present indication. In various embodiments, the container-present indication is provided by the RFID reading unit, which detects an RFID tag coming into range and optionally reads it. In various embodiments, the container-present indication is provided by a pressure switch or optointerruptor that indicates an appropriate mass or volume, respectively, has been positioned in a container location.

In various embodiments, the starting step includes receiving a container-present indication or a cycle-complete indication. If the cycle-complete indication is received ("DONE"), the method is terminated.

In various embodiments, the starting step includes repeatedly attempting to read an RFID tag until the RFID tag of the one of the containers is read, and providing the container-present indication when the tag of the one of the containers is read. Read attempts can be separated by time delay, which can be constant, regular according to a sequence (e.g., increasing), or random. In various of these embodiments, the container-present indication is provided only if the identification code of the RFID tag read is different from the identification code of a previously-read RFID tag. This can restrict an operator, for example, from re-installing an empty container. In various embodiments, step 640 includes the controller's automatically providing an indication on a user interface that any one of the containers present should be removed from position and the next one of the containers should be positioned so its RFID tag is in the antenna range.

In step 650, in response to the container-present indication, the RFID tag of the one of the containers is read, using the RFID reading unit, to determine an identification code of the container. The code can be, e.g., a name, GUID, GTIN, or SGTIN, as described herein, or can indicate a type of fluid or actual serial number of the container.

In various embodiments, step 650 includes reading an item serial number from the RFID tag of the one of the containers and retrieving the respective identification code corresponding to the read item serial number from a database. This is as discussed above with respect to step 590 (FIG. 5). Step 650 is followed by step 660.

In step 660, the determined identification code of the one of the containers is automatically verified against the first reference identification code in the sequence using a controller. Step 660 is followed by decision step 670 and step 665.

In step 665, in various embodiments, if the determined identification code of the one of the containers cannot be verified (step 660) against the reference identification code in the sequence, the controller automatically provides an indication on a user interface that the one of the containers is not correct.

Decision step 670 decides whether all values in the sequence have been verified against container identification codes read using the RFID reading unit. If so, the method is complete. If not, the next step is step 640, or optionally step 675. In this way, the starting through verifying steps (steps 640-670) are repeated, using successive values from the sequence in the verifying step, until all values in the sequence have been verified, or the cycle-complete indication (discussed above in step 640) has been received.

In step 675, in various embodiments, starting step 640 or decision step 670 includes repeatedly attempting to read a first RFID tag until no RFID tag is read. In these embodiments, once no tag is read, starting step 640 includes repeatedly attempting to read a second RFID tag until the RFID tag of the one of the containers is read, and then providing the container-present indication. This reduces the probability of misreading the already-present container as a new container. Step 675 is followed by decision step 640.

In various embodiments, at least one of the movable fluid containers holds a cleaning fluid or a conditioning fluid. Different containers can hold different inks, cleaning fluids, or conditioning fluids, and various methods described with respect to FIG. 6 can be used to sequence them.

In an example, such a method is used in an inkjet printer system that includes a printhead. The fluid-supply hose is part of an ink-delivery system that delivers fluid from a container to the printhead. A sequence of fluids is used to change the ink to be supplied through the printhead from a first ink to a second ink. The first ink has a first dye or pigment therein, and the dye or pigment remains in solution or dispersion therein over a first range of pH. A dye or pigment in the second ink remains in solution or dispersion therein over a second range of pH that does not overlap with the first range. Therefore, cleaning the printhead and ink-delivery system between the first ink and the second ink reduces the probability that residual first ink in the ink-delivery system will interact with the second ink and degrade its performance. For example, interactions can form precipitates or gels, which are undesirable in liquid inks.

In this example, the sequence of reference container-identification codes includes, in sequence, codes for a first cleaning fluid, a second cleaning fluid, and the second ink. The first cleaning fluid has a pH in the first range of pH, and the second cleaning fluid in the second range. Together with the method described herein, flush and fill steps can be used.

The first ink can be drained and a container of the first cleaning fluid installed in the ink-delivery system and verified according to FIG. 6. Verifying the container of first cleaning fluid against the reference sequence reduces the probability that the second cleaning fluid will be used before all the first ink is flushed out of the system.

The ink-delivery system can be flushed with the first cleaning fluid from the installed, verified container, and then the first cleaning fluid can be drained out of the ink-delivery system. The flush and drain steps can be repeated. If more than one container of first cleaning fluid is required, the reference sequence can include codes for an appropriate number of containers.

A container of the second cleaning fluid can then be installed and verified. The ink-delivery system can then be flushed with the second cleaning fluid and drained one or more times. The reference sequence can indicate the appropriate number of containers.

This leaves the ink-delivery system clean, and with any residual fluid being in the second range of pH. A container of the second ink can then be installed and verified against the reference sequence, and printing can commence with the second ink.

In another example, the first ink is aqueous and the second ink is non-aqueous. The first cleaning fluid is an aqueous fluid with a pH in the first range. The second cleaning fluid is non-aqueous, and uses the same solvent as the second ink. The steps described in the previous example can be used, with one or more container(s) of the first cleaning fluid, the second cleaning fluid, and the second ink verified before use as shown in FIG. 6.

In another example, the first ink includes a component, e.g., a surfactant, humectant, corrosion inhibitor, or biocide, with which the second ink is incompatible. Cleaning fluids adapted to dissolve the particular component in question can be used, followed by first and second cleaning fluids as described in the above examples.

In another example, to disinfect the ink-delivery system, bleach and a bleach-flushing fluid that does not react with bleach are used. After the first cleaning fluid, the ink-delivery system is flushed with bleach from a verified container, then with the bleach-flushing fluid from a verified container. The second cleaning fluid can then be used. In other examples, bleach and the bleach-flushing fluid can be used without the first and second cleaning fluids. Verifying the containers of bleach and the bleach-flushing fluid reduces the probability that the two will be accidentally installed in the opposite order, which would leave bleach in the ink-delivery system to react with the second ink.

Further examples of cleaning fluids and ways of cleaning are given in U.S. Pat. No. 6,224,185 to Fassler et al., U.S. Pat. No. 6.398,351 to Blum et al., U.S. Pat. No. 6,196,657 to Hawkins et al., U.S. Pat. No. 6,592,201 to Sharma et al., U.S. Pat. No. 6,572,215 to Sharma, U.S. Pat. No. 7,178,897 to Huliba, U.S. Pat. No. 7,163,283 to Loyd et al., or U.S. Pat. No. 7,213,902 to DeVivo et al., all of which are incorporated herein by reference. An example of a commercial cleaning fluid is KODAK VERSAMARK FF10 Flush Fluid. Examples of commercial inks are KODAK VERSAMARK FD1006 BLACK INK and KODAK VERSAMARK FD1036 BLACK INK. KODAK VERSAMARK FR1014 REPLENISHMENT FLUID is an example of a commercial replenishment fluid used to restore ink in the ink-delivery system to the proper concentration.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. The word "or" is used in this disclosure in a non-exclusive sense, unless otherwise explicitly noted.

The invention has been described in detail with particular reference to certain preferred embodiments thereof, but it will be understood that variations, combinations, and modifications can be effected by a person of ordinary skill in the art within the spirit and scope of the invention.

PARTS LIST 10 base station
12 air interface
14 reader
16 reader's antenna
18 memory unit
20 logic unit
22, 24, 26 RFID tag
30, 44, 48 antenna
42 RF station
52 range
54 antenna
56 power converter
58 demodulator
60 modulator
62 clock/data recovery circuit
64 control unit
80 output logic
310 data-processing system
320 peripheral system
330 user-interface system
340 data-storage system
405 fluid station
410 fluid-supply hose
413 inlet end
415 RFID tag of hose
416 outlet end
420 movable fluid container
422 fluid-container location
425 RFID tag of container
428 port
429 fluid level
430 antenna mount
432 antenna
434 antenna range
438 RFID reading unit
458 port
459 fluid level
486 controller
488 database
450 fluid-supply hose
453 inlet end 455 RFID tag of hose
456 outlet end
460 movable fluid container
462 fluid-container location
465 RFID tag of container
470 antenna mount
472 antenna
474 antenna range
510 provide hose step
520 provide RFID reading unit step
530 read container tag step
535 container identification code
540 read hose tag step
545 hose identification code
550 verify codes step
560 receive reference code step
562 read reference tag step
565 reference code
590 retrieve code from database step
610 provide RFID reading unit step
620 provide hose step
625 receive reference hose code step
626 read hose tag step
627 verify hose code step
630 receive reference code sequence step
640 container present? decision step
650 read container tag step
660 verify codes step
665 indicate error step
670 more sequence values? decision step
675 read until no tag present step

The invention claimed is:

1. A method of changing from first fluid to a second fluid, verifying the identification of fluids to be supplied successively through a fluid-supply hose of an inkjet printer, the hose being adapted to connect to one at a time of a plurality of movable fluid containers, each container including an RFID tag, wherein the first fluid or a component of the first fluid being incompatible with the second fluid, the method comprising:
providing an RFID reading unit including an antenna having a range;
providing the fluid-supply hose;
a reference-receiving step of a controller receiving a sequence of reference container identification codes, the sequence of reference container identification codes includes a sequence of one or more cleaning or conditioning fluids to be supplied through the fluid-supply hose between the supplying of the first fluid and the second fluid through the fluid-supply hose;
a starting step of receiving a container-present indication, wherein when the container-present indication is received, one of the containers is positioned so that its RFID tag is in the antenna range;
in response to the container-present indication, reading the RFID tag of the one of the containers using the RFID reading unit to determine an identification code of the container;
automatically verifying the determined identification code of the one of the containers against the first reference identification code in the sequence using a controller;
drawing fluid from the container through the supply hose having the verified identification code; and
repeating the starting through verifying drawing steps, using successive values from the sequence in the verifying step, until all values in the sequence have been verified against container identification codes read using the RFID reading unit.

2. The method according to claim 1, wherein the hose-providing step includes providing the fluid-supply hose having an RFID tag, wherein the RFID tag of the hose is within the range of the antenna;
the method further including receiving a reference hose identification code;
reading the RFID tag of the fluid-supply hose using the RFID reading unit to determine an identification code of the hose; and
automatically verifying the determined identification code of the hose against the reference hose identification code using the controller.

3. The apparatus according to claim 1, wherein the starting step further includes receiving a container-present indication or a cycle-complete indication and the repeating step includes repeating until all values in the sequence have been verified or the cycle-complete indication has been received.

4. The method according to claim 1, wherein the reading step includes reading an item serial number from the RFID tag of the one of the containers and retrieving the respective identification code corresponding to the read item serial number from a database.

5. The method according to claim 1, wherein at least one of the movable fluid containers holds ink.

6. The method according to claim I, wherein at least one of the movable fluid containers holds cleaning fluid.

7. The method according to claim 1, wherein the reference-receiving step includes reading a reference RFID tag using the antenna to determine the reference identification code sequence.

8. The method according to claim 7, wherein the reference RFID tag is affixed to the first container.

9. The method according to claim 1, wherein the starting step includes repeatedly attempting to read an RFID tag until the RFID tag of the one of the containers is read, and providing the container-present indication when the tag of the one of the containers is read.

10. The method according to claim 1, wherein, while repeating, the starting step includes repeatedly attempting to read a first RFID tag until no RFID tag is read, then repeatedly attempting to read a second RFID tag until the RFID tag of the one of the containers is read, and then providing the container-present indication.

11. The method according to claim 10, wherein the container-present indication is provided only if the identification code of the second RFID tag is different from the identification code of the first RFID tag.

12. The method according to claim 10, wherein the starting step includes the controller's automatically providing an indication on a user interface that any one of the containers present should be removed from position and the next one of the containers should be positioned so its RFID tag is in the antenna range.

13. The method according to claim 1, wherein the verifying step includes, if the determined identification code of the one of the containers cannot be verified against the reference identification code in the sequence, the controller's automatically providing an indication on a user interface that the one of the containers is not correct.

14. The method according to claim 1, wherein the incompatibility is pH.

15. The method according to claim 1, wherein the incompatibility is solvent.

16. The method according to claim 1, wherein the incompatibility is presence of a component in the first fluid that isn't compatible with the second fluid.

17. The method according to claim 1, wherein the incompatibility is the presence of a bleaching agent.

* * * * *